United States Patent
Cok et al.

(10) Patent No.: US 9,256,809 B2
(45) Date of Patent: *Feb. 9, 2016

(54) ENABLING AN AUTHENTICATION DEVICE WITH TEMPORARY TARGET

(71) Applicant: Eastman Kodak Company, Rochester, NY (US)

(72) Inventors: Ronald S. Cok, Rochester, NY (US); Joseph A. Manico, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/198,969

(22) Filed: Mar. 6, 2014

(65) Prior Publication Data

US 2015/0254533 A1    Sep. 10, 2015

(51) Int. Cl.
*G06K 9/74* (2006.01)
*G07C 9/00* (2006.01)

(52) U.S. Cl.
CPC ... *G06K 9/74* (2013.01); *G07C 9/00* (2013.01)

(58) Field of Classification Search
CPC ........... G07C 9/00; G06K 9/74; G07D 7/122; G07D 7/124; G07D 7/2075
See application file for complete search history.

(56) References Cited

U.S. PATENT DOCUMENTS

| | | | |
|---|---|---|---|
| 6,603,871 B2 | 8/2003 | Liang | |
| 7,434,063 B2 | 10/2008 | Watanabe | |
| 7,552,864 B2 | 6/2009 | Weilacher et al. | |
| 7,831,996 B2 | 11/2010 | Dholakia et al. | |
| 8,006,083 B2 | 8/2011 | Sakakibara | |
| 8,006,898 B2 * | 8/2011 | Reinisch et al. | 235/379 |
| 8,153,984 B2 * | 4/2012 | Olm et al. | 250/367 |
| 8,330,122 B2 * | 12/2012 | Smith et al. | 250/458.1 |
| 8,619,245 B1 * | 12/2013 | Pawlik et al. | 356/71 |
| 8,937,712 B2 * | 1/2015 | Pawlik et al. | 356/71 |
| 2005/0018013 A1 * | 1/2005 | Nelson et al. | 347/44 |
| 2006/0131518 A1 * | 6/2006 | Ross et al. | 250/556 |
| 2012/0275640 A1 * | 11/2012 | Widzinski et al. | 382/100 |
| 2012/0313749 A1 * | 12/2012 | Pawlik et al. | 340/5.8 |

* cited by examiner

*Primary Examiner* — Kara E Geisel
*Assistant Examiner* — Dominic J Bologna
(74) *Attorney, Agent, or Firm* — Nelson A. Blish (57) ABSTRACT

A method of enabling an authentication device includes providing a first enabling target. One or more attributes of the first enabling target is measured with the authentication device at a first time and compared to a first predetermined expected value. When the at least one measured attribute of the first enabling target matches the first predetermined expected value, the authentication device is enabled for only a first predetermined enablement time.

13 Claims, 8 Drawing Sheets

ENABLING AN AUTHENTICATION DEVICE WITH TEMPORARY TARGET

CROSS REFERENCE TO RELATED APPLICATIONS

Reference is made to commonly-assigned copending U.S. patent application Ser. No. 14/198,995 filed Mar. 6, 2014, entitled AUTHENTICATION DEVICE WITH TEMPORARY ENABLING TARGET, by Cok et al., to commonly-assigned copending U.S. patent application Ser. No. 13/587,119 (now U.S. Publication No. 2014/0048723), filed Aug. 16, 2012, entitled AUTHENTICATION WITH ACCESS CONTROL AND CALIBRATION, by Pawlik et al.; and to commonly-assigned copending U.S. patent application Ser. No. 13/587,139 (now U.S. Pat. No. 8,619,245), filed Aug. 16, 2012, entitled AUTHENTICATION DEVICE WITH ACCESS CONTROL AND CALIBRATION, by Pawlik et al.; the disclosures of which are incorporated herein.

FIELD OF THE INVENTION

This invention relates to item authentication using an enabled authentication device to test targets having embedded markers and thereby deter counterfeit products.

BACKGROUND OF THE INVENTION

Marker-plus-reader-based authentication systems can be used to distinguish authentic from counterfeit items. The authentication is based on detecting the presence of secret markers in authentic items with special readers. The reader responds to the detected presence of the secret markers by giving a pass/fail indication. It is important that the reader (authentication device) does not fall into unauthorized possession because its pass/fail functionality can be exploited to manufacture a replicated security feature on the counterfeit item.

It is useful therefore to have a means of enabling the authentication device that cannot be realized by possessing the authentication device alone. Such an enabling means could be, for example, a key or password. However, the corresponding lock or password request on the authentication device could make apparent such a security mechanism and a counterfeiter would attempt to disable the lock or password mechanism.

Because there are ongoing efforts to counterfeit goods and to circumvent the efficacy of counterfeit detection systems, an authentication device with improved security is desirable.

SUMMARY OF THE INVENTION

Briefly, according to one aspect of the present invention an authentication device requires an enabling target to activate and enable the authentication device; the enabling target is separate from the authentication device. Thus, the possession of the authentication device does not make the need for an enabling target readily apparent.

In an embodiment of the present invention, a method of enabling an authentication device includes providing an enabling target; measuring one or more attributes of the enabling target with the authentication device; comparing at least one measured attribute to a predetermined expected value; and enabling the authentication device for only a predetermined enablement time when the at least one measured attribute matches the predetermined expected value. The authenticator can then be operated to authenticate an item.

In one embodiment, an "enabling" target is a coating containing the markers that the authenticator can detect in a predetermined composition. The markers in the enabling target decay over time so that after the predetermined enablement time, the at least one measured attribute of the target markers no longer matches the predetermined expected value. In another embodiment, the at least one measured attribute is recorded in the authenticator so that subsequent attempts to enable the authenticator with the same target will fail. In yet another embodiment, the predetermined expected value changes over time so that different enabling targets are required to re-enable the authentication device.

In accordance with the present invention, a method of enabling an authentication device includes providing a first enabling target; measuring one or more attributes of the first enabling target with the authentication device at a first time; comparing at least one measured attribute of the first enabling target to a first predetermined expected value; and enabling the authentication device for only a first predetermined enablement time when the at least one measured attribute of the first enabling target matches the first predetermined expected value.

The present invention provides an authentication device and method with enhanced security.

The invention and its objects and advantages will become more apparent in the detailed description of the preferred embodiment presented below.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

DETAILED DESCRIPTION OF THE INVENTION

The present invention is directed in particular to elements forming part of a device or to elements that cooperate with a device in accordance with the present invention. It is to be understood that elements not specifically shown or described may take various forms well known to those skilled in the art.

Figure 1:
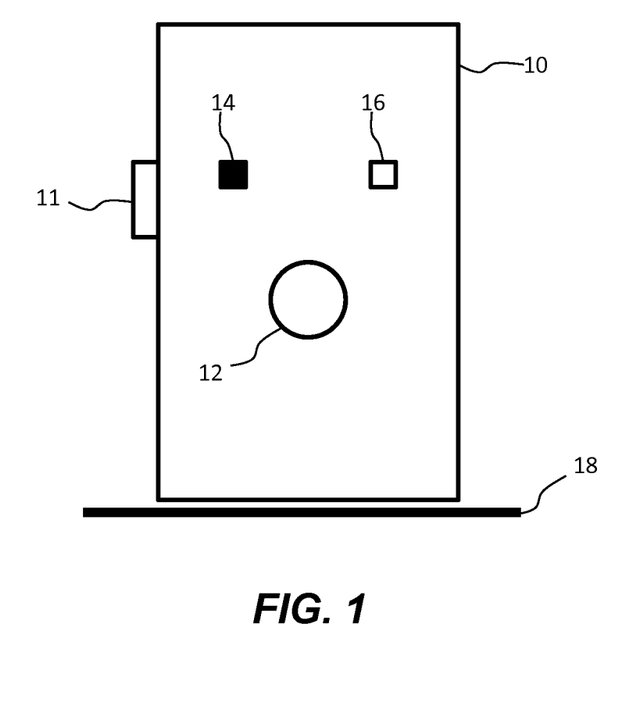
FIG. 1 is a schematic diagram of an authentication device and an authentic item.

Referring first to FIG. 1, an authentication device (security marker detection device) 10 includes an on/off switch 11 to power an authentication pass indicator 14 or an authentication fail indicator 16 in response to operating a test button 12 when presented with an item 18 containing markers in a predetermined composition. Upon power-up, the authentication device 10 cycles through a sequence of optical measurements, discussed in more detail below. If the item 18 does contain markers in a predetermined composition, the authentication device 10 detects the markers, compares the markers to a predetermined expected value to detect a match, and operates the authentication pass indicator 14 (as shown) and the item 18 is authenticated. If the item 18 does not contain markers in the predetermined composition, the authentication device 10 compares whatever markers are detected, if any, to the predetermined expected value but does not detect a match, and therefore operates the authentication fail indicator 16 (not shown) and the item 18 is not authenticated.

Figure 2:
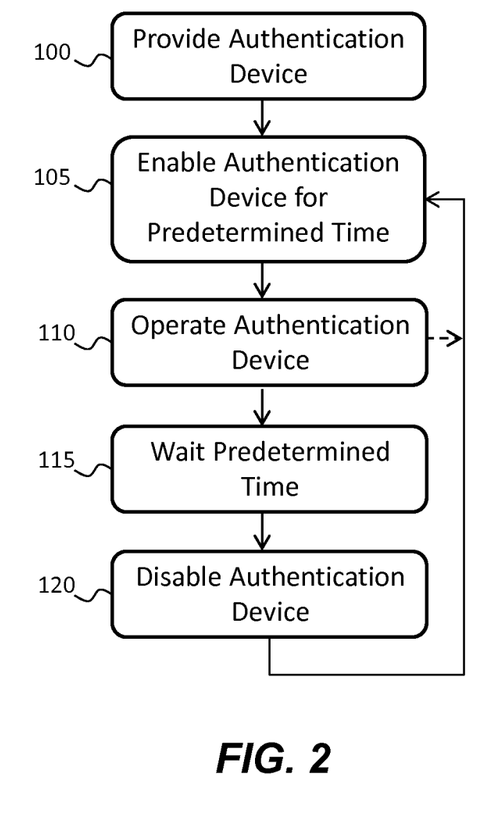
FIG. 2 is a flow diagram illustrating a method of the present invention.

Referring now to FIG. 2, in an embodiment of the present invention, the authentication device 10 has an enabling mode and a normal authentication mode (operating mode). When the authentication device 10 is first provided to a user in step 100, the authentication device 10 is in the enabling mode and is not effective to authenticate an item. The authentication device 10 is then enabled for a predetermined time in step 105 to operate in the normal authentication mode. The authentication device 10 can then be operated in step 110 to authenticate the items 18 as described above with respect to FIG. 1. In an embodiment, at any time after being placed in the normal authentication mode, the authentication device 10 can be re-enabled and the predetermined time reset. Once the predetermined time has expired by waiting (step 115), the authentication device 10 is disabled in step 120, after which the authentication device 10 will no longer operate in normal authentication mode and is placed in the enabling mode. Disablement can be performed, for example, by disabling the function of the test button 12 or by setting a mode control value.

Figure 3:
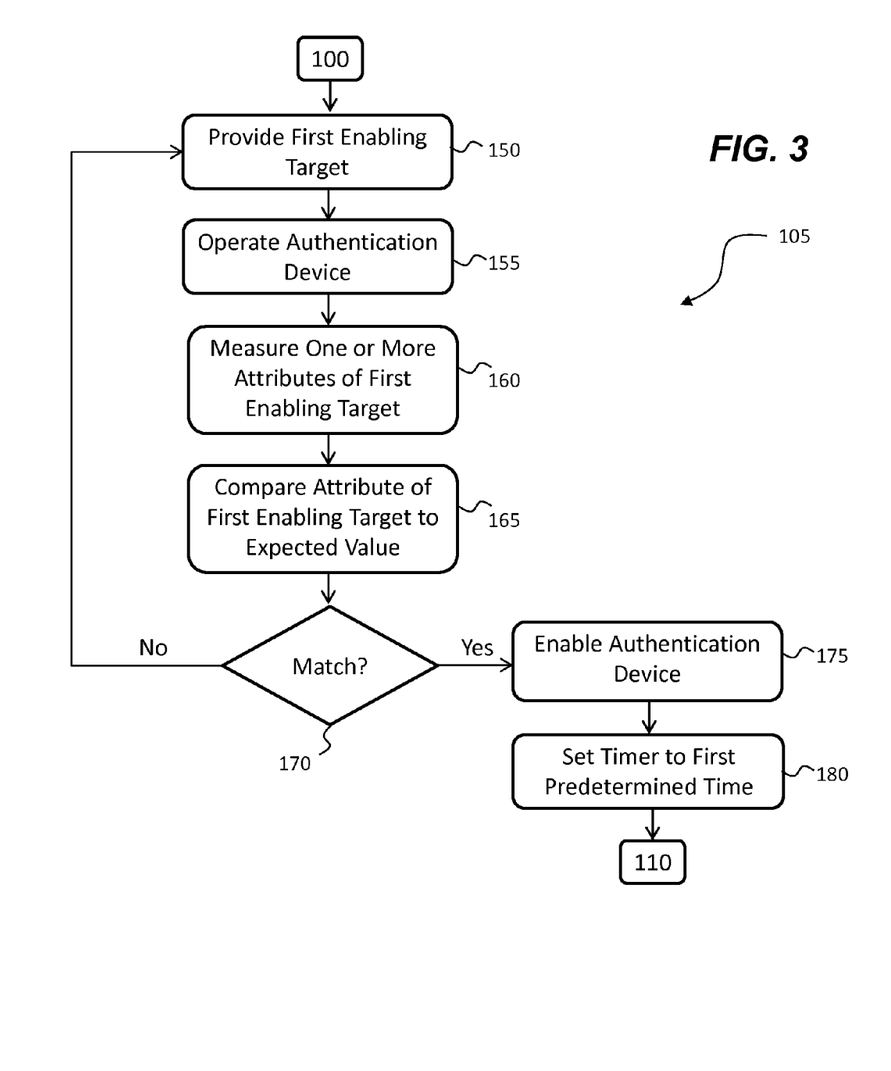
FIG. 3 is a flow diagram illustrating a more detailed method of the present invention.
Figure 4:
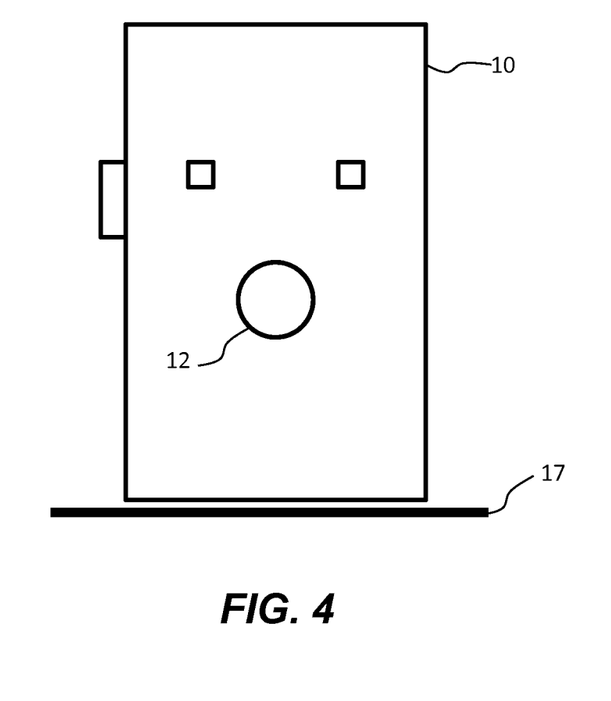
FIG. 4 is a schematic diagram of an authentication device and enabling target according to an embodiment of the present invention.

Referring next to FIGS. 3 and 4, the enabling step 105 is described in more detail. The authentication device 10 is provided in step 150 in the enabling mode with a first enabling target 17 and operated with the test button 12 (or another control, not shown) in step 155. One or more attributes of the first enabling target 17 is measured with the authentication device 10 at a first time in step 160. At least one measured attribute of the first enabling target 17 is compared to a first predetermined expected value in step 165. If the at least one measured attribute does not match the first predetermined expected value in step 170, the process of enabling the authentication device 10 begins again. If the at least one measured attribute does match the first predetermined expected value in step 170, the authentication device 10 is enabled for only a first predetermined enablement time by placing the authentication device 10 in the normal authentication mode in step 175 and setting a timer in the authentication device to the first predetermined time in step 180. In an embodiment (not shown), the authentication device can provide an indicator signal that normal authentication mode is operable, for example by operating a separate indicator (not shown) or operating the authentication pass indicator 14 or authentication fail indicator 16 in a unique way (such as blinking the indicators 14, 16 or operating the indicators 14, 16 simultaneously).

In a further embodiment of the present invention, the method described in FIG. 3 is repeated for a second enabling target. A second enabling target is provided (step 150), its attributes measured (step 160) with the authentication device 10 at a second time after the first time, at least one measured attribute of the second enabling target is compared to a second predetermined expected value (step 165) different from the first predetermined measured value, and the authentication device 10 is enabled for only a second predetermined enablement time when the at least one measured attribute of the second enabling target matches the second predetermined expected value (steps 170, 175, 180).

By providing a second enabling target 17, the authentication device 10 is re-enabled after the predetermined enablement time has expired (step 115). Thus, by providing successive enabling targets 17, the authentication device 10 is periodically re-enabled and the authentication device 10 operates as long as the enabling targets 17 are periodically provided.

Figure 5A:
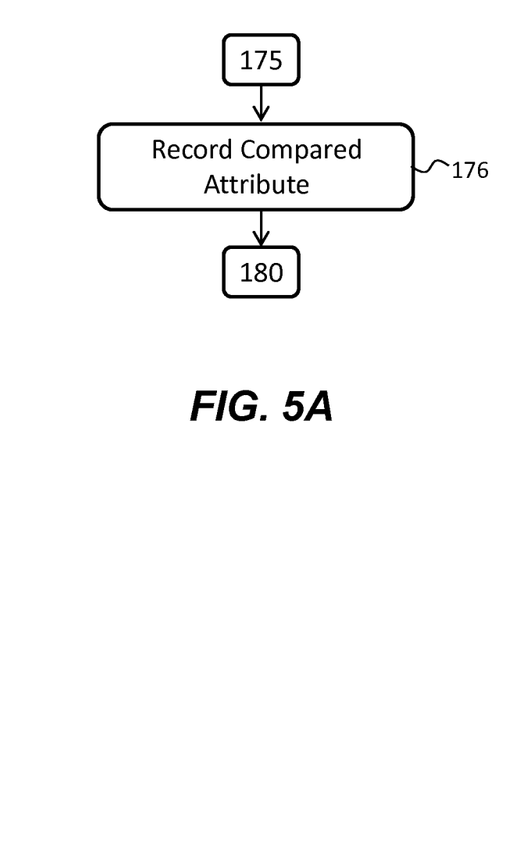
FIGS. 5A and 5B are a flow diagram illustrating a more detailed method of the present invention.
Figure 5B:
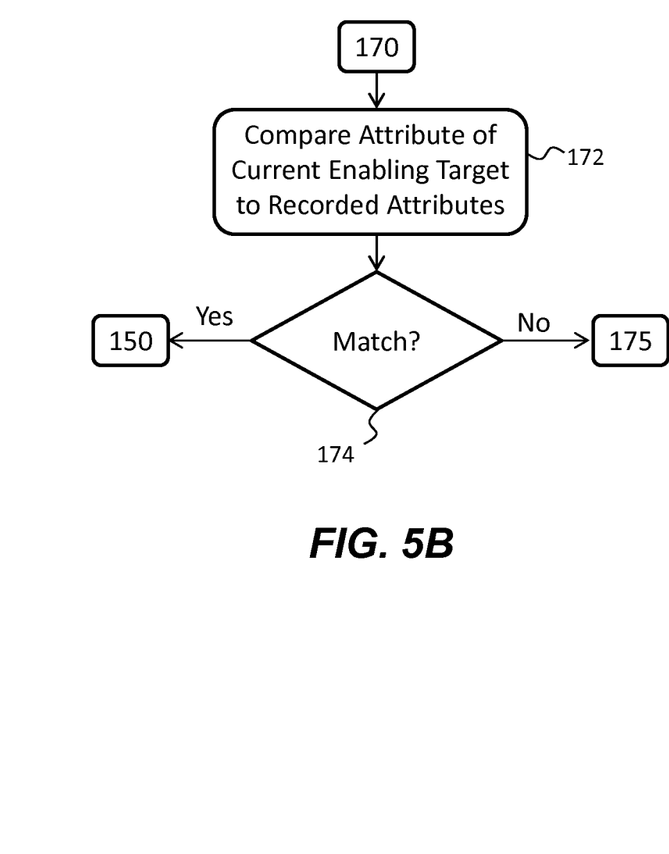

In an embodiment of the present invention, the measured attribute values of the first enabling target 17 are recorded and a comparison to recorded attribute values made as a part of the enabling process. If a previously recorded comparison attribute is found to match a current comparison attribute, the authentication device 10 is not re-enabled. Thus, enabling targets 17 cannot be reused. Referring to FIG. 5A, the compared attribute of step 165 is recorded in step 176 after the match (step 170) is successfully determined as part of the enablement process of FIG. 3. As shown in FIG. 5B, the recorded attributes are compared to the attribute of the current enabling target in step 172. If a match is detected in step 174, the enabling target 17 has been used before, the authentication device 10 is not enabled and another enabling target 17 is awaited. If a match is not detected in step 174, the enabling target 17 has not been used before and the authentication device is 10 enabled in step 175. In different embodiments, step 170 and step 174 are performed in different temporal orders.

Thus, in an embodiment of the present invention, one or more at least one measured attribute of the first enabling target 17 is recorded. One or more attributes of the first enabling target 17 is measured with the authentication device 10 at a second time after the first time. The at least one measured attribute of the first enabling target 17 measured at the second time is compared with the recorded attribute(s) and the authentication device 10 is not enabled when the at least one attribute of the first enabling target 17 measured at the second time matches the recorded measured attribute(s).

In various embodiments, the comparison step is dependent upon the predetermined enabling time so that the second enabling target 17 cannot be used until the predetermined time has expired (step 115). Alternatively, the second enabling target 17 can be used even if the predetermined time has not expired (as shown where step 105 follows step 110 in FIG. 2). Hence, in an embodiment, the second time is at least the first predetermined time after the first time. The second predetermined time can be the same as the first predetermined time or different.

When a series of successive different enabling targets 17 is provided to successively re-enable the authentication device 10, a corresponding successive series of predetermined expected values matching the response of the series of successive different enabling targets 17 is used for comparison to re-enable the authentication device 10.

In one embodiment of the present invention, the response of a given enabling target 17 is compared to all of the recorded predetermined expected values (see step 172 of FIG. 5B). In this embodiment, enabling targets 17 are provided in any order.

Thus, in this embodiment, at least one measured attribute of each of the plurality of enabling targets 17 is compared to any of the plurality of different predetermined expected values recorded in the authentication device 10. When the at least one measured attribute matches any of the plurality of predetermined expected values, the authentication device 10 is enabled for the first predetermined enablement time. Furthermore, a plurality of different enabling targets 17 is provided together with one or more predetermined enablement times. One or more attributes of each of the plurality of different enabling targets 17 is measured with the authentication device 10 and compared to any of the plurality of different predetermined expected values. When the at least one measured attribute of each of the plurality of different enabling targets 17 matches any of the plurality of predetermined expected values, the authentication device 10 is enabled for one of the one or more predetermined enablement times. In an embodiment, the successive series of predetermined expected values are recorded in the authentication device 10.

Figure 6:
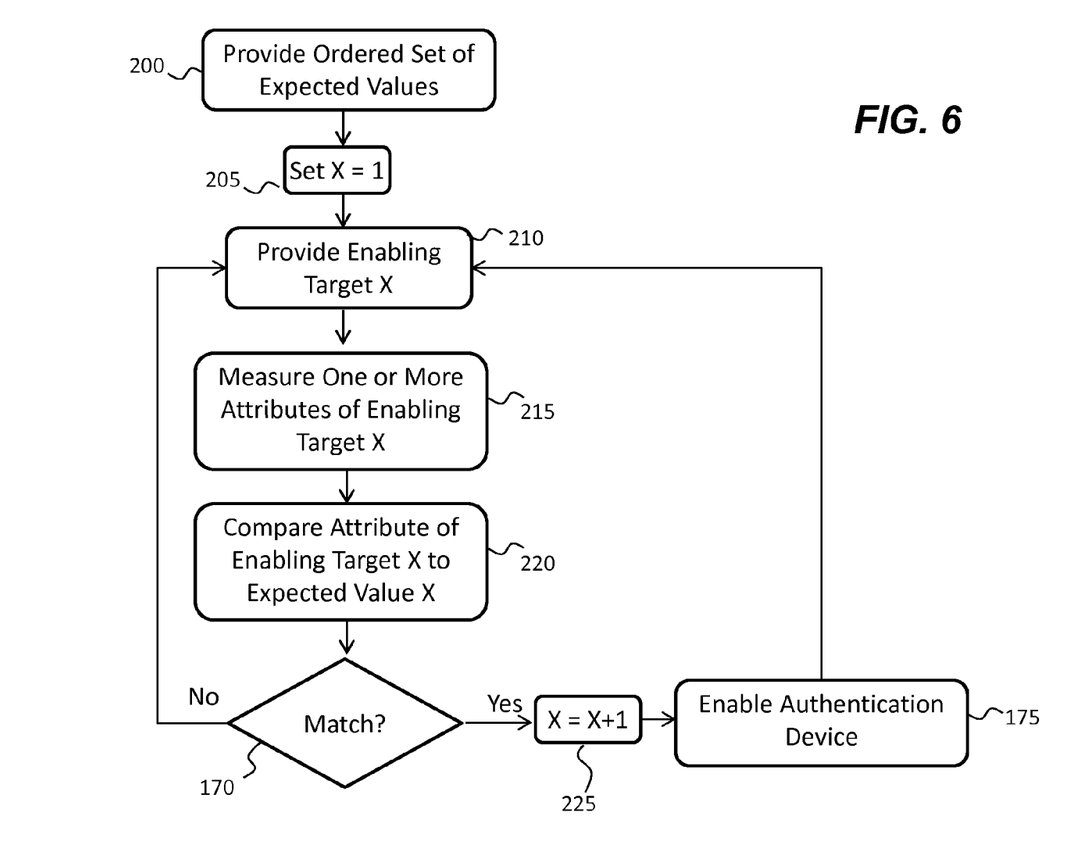
FIG. 6 is a flow diagram illustrating a more detailed method of the present invention.

In yet another embodiment, the plurality of different predetermined expected values is provided as an ordered set of different predetermined expected values and the plurality of enabling targets 17 are provided as a corresponding ordered set of enabling targets 17. Referring to FIG. 6, an ordered set of predetermined expected values is provided in step 200. A counter (arbitrarily designated as 'X') is initialized to 1 in step 205 and a corresponding first enabling target 17 is provided in step 210 and at least one measured attribute of the first enabling target 17 is measured in step 215 and compared with the corresponding first predetermined expected value in step 220. If a match is not found in step 170, the authentication device 10 awaits the correct first enabling target 17. If a match is found in step 170, the counter is incremented in step 225 and the authentication device 10 enabled in step 175. The authentication device 10 is then operable in normal authentication mode and awaits the second enabling target or an elapse of the predetermined time that disables the authentication device 10.

The process repeats with successive enabling targets 17 and expected values. Thus, according to this embodiment, one or more measured attributes of each of the plurality of enabling targets 17 are successively measured with the authentication device 10 at successive times in the order specified in the ordered set of enabling targets 17 and compared with the corresponding one of the plurality of ordered different predetermined expected values. When the at least one measured attribute of the enabling target 17 matches the corresponding predetermined expected value, the authentication device 10 is enabled for one of the one or more predetermined enablement times. The predetermined enablement times can be different so that different periods of time elapse before the authentication device 10 is disabled (step 120). Once the authentication device 10 is enabled, it can be operated in the normal authentication mode to authenticate items 18.

In a further embodiment of the present invention, to provide additional security, the authentication device 10 is disabled when the measured attribute does not match the predetermined expected value. Thus, an attempt by a user to enable the authentication device 10 with an inappropriate enabling target 17 will disable the authentication device 10. In other embodiments, a record is created when the authentication device 10 is enabled or disabled or when at least one measured attribute does not match the first predetermined expected value.

Figure 7:
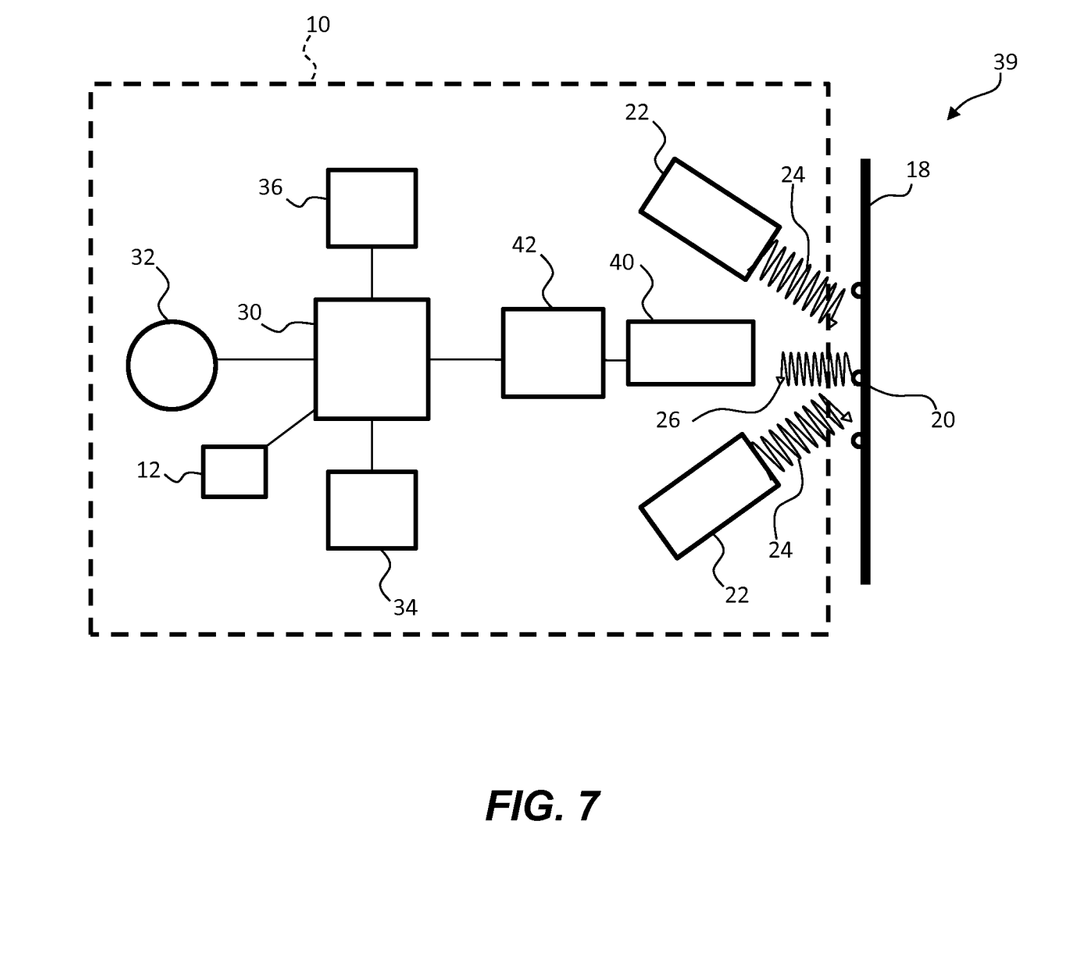
FIG. 7 is a schematic diagram of an authentication device and a security marker detection system according to an embodiment of the present invention.

Referring to FIG. 7, a security marker detection system 39 detects emission of security marker particles 20 in a non image-wise fashion using an authentication device 10. The authentication device 10 includes a photodetector 40, a microprocessor 30, a memory 34 storing a first predetermined expected value and a first predetermined enablement time, a timer 36, a control 12, and an information display 32. The authentication device 10 can also include one or more irradiation sources 22 to direct exciting electromagnetic radiation 24 towards the security marker particles 20 in the item 18 to be authenticated or towards the first enabling target 17 (not shown). The exciting electromagnetic radiation 24 can be in the ultraviolet, visible or infrared wavelength range. Typical wavelengths are 400 nm-700 nm for visible radiation, 200 nm-400 nm for ultraviolet radiation, and 700 nm-2500 nm for infrared radiation. The item 18 contains a random distribution of security marker particles 20 either in an ink, in an overcoat varnish, or embedded in a substrate. The security marker particles 20 emit electromagnetic radiation 26 as a response to the exciting electromagnetic radiation 24 from the irradiation sources 22 that is detected by a photodetector 40 and amplified by an amplifier 42. A microprocessor 30 processes and analyzes the photodetector signal and determines a pass or a fail that is indicated on the authentication indicator 32. Authentication indicator 32 can include the authentication pass indicator 14 and authentication fail indicator 16 and other indicators. Pass or fail indication can, for example, represent authentic and non-authentic items 18, respectively.

The authentication device 10 includes the memory 34 for storing information, including the first predetermined expected value, the first predetermined enablement time, mode, software, and a timer value, and a timer 36 for timing intervals of time. The authentication device 10 can include a computer having a stored program, memory, interfaces, and input/output devices, as are commonly known in the art. In embodiments, the microprocessor 30, the memory 34, and the timer 36 are integrated circuits including digital logic circuits and time base devices (clocks) as are well known in the computer engineering arts. The memory 34 can include volatile or non-volatile memory and can be distributed in various circuits, including the microprocessor 30 and the timer 36, or can include a separate integrated circuit connected directly or indirectly to either of the microprocessor 30 or the timer 36.

Suitable microprocessors 30, memories 34, timers 36, and authentication indicators 32 are well known in the computing arts, as are useful software methods, state machine control, real-time hardware or software, interface control, indicator control, and user interaction techniques. In a particular embodiment, the micro-processor is a stored program machine with a software program stored in the memory 34 or in a memory integrated with the microprocessor 30. The microprocessor 30 can be a state machine or execute the steps of a software state machine. The steps of the present invention are performed by executing the stored software program by the micro-processor 30 and interacting with the various devices and elements in the authentication device 10 and the security marker detection system 39. Suitable photodetectors 40 and amplifiers 42 are also well known in the optical arts.

The software stored in the memory 34 is operable by the microprocessor 34 to measure one or more attributes of a first enabling target 17 or items 18 at a first time, compare at least one measured attribute of the first enabling target 17 with the stored first predetermined expected value, and enable the authentication device 10 to authenticate when operated by the control 12 for only the first predetermined enablement time when the at least one measured attribute of the first enabling target 17 matches the first predetermined expected value. In general, the methods of the present invention and illustrated and described with respect to the various figures are embodied in hardware that operates to perform the methods of the present invention or software programs stored in the memory 34 of the authentication device 10. The authentication device 10 can a single device with separate parts or constructed of separate devices, for example networked or otherwise communicably interconnected devices.

The authentication indicator 32 can include light emitting diodes, alphanumeric displays, liquid crystal displays, or other information displays known in the art. The amplifier 42 can include analog or digital circuits for inputting a signal, amplifying or otherwise processing the input signal, and converting it to a form usable by the microprocessor 30, for example with an analog-to-digital converter, and providing the converted signal to the microprocessor on an information interface, for example a Universal Serial Bus (USB) interface. Photodetectors 40 responsive to electromagnetic radiation to provide electrical signals are known in the art and any of a variety of such photodetectors 40 is included in the present invention. Examples of irradiation sources 22 include light emitting diodes (LED) or laser diodes (LD).

The security marker particles 20 can include any fluorescent or phosphorescent material that is embedded in or on a substrate of item 18 (for example a label) or enabling target 17 (for example a card) that responds to exciting electromagnetic radiation 24 from the irradiation sources 22 with emitted electromagnetic radiation 26 that is detectable by the photodetectors 40. Such materials and substrates are known in the chemical and printing arts, as are methods for the construction of labels useful as items 18 and cards useful as enabling targets 17.

In an embodiment, the item 18 and the enabling target 17 can contain similar materials in different amounts or spatial distributions. In an alternative embodiment, the item 18 and the enabling target 17 include different materials. In either embodiment, a similar process is performed to authenticate the item 18 or enable the authentication device 10 with the first enabling target 17.

The authentication device 10 conducts a series of optical measurements to detect the composition of the security marker particle 20 components in either the item 18 or the enabling target 17 with the photodetector 40 by causing security marker particles 20 in the item 18 to emit radiation as fluorescence or phosphorescence in response to irradiation by irradiation source 22, for example by controlling and powering the irradiation sources 22. Only if the response is within a tolerance band centered on predetermined expected values will the authentication device 10 detect a match. Depending on the predetermined value matched, the authentication device 10 is enabled to operate in normal authentication mode and authenticates the item 18 tested. If the responses of the enabling target 17 or item 18 are outside the tolerance intervals, no match is found and no action taken, other than to indicate or record a failed authentication or enablement.

Because of gradual aging of components, external factors and general measurement variability, the results of the measurements of the enabling target 17 will not always exactly match the stored values. The variance can be a sign of degradation of the optical and electrical components of the sensing system in authentication device 10. The authentication device 10 can compensate for these factors by calculating one or more calibration factors that can be used to mathematically regenerate the measurement results of a non-degraded system. The calibration factors are then also used to correct the responses in the pass/fail authentication processes. Using this calibration approach, the authentication device 10 can be operated with narrow pass bands and therefore high selectivity while still maintaining robust authentication.

Figure 8:
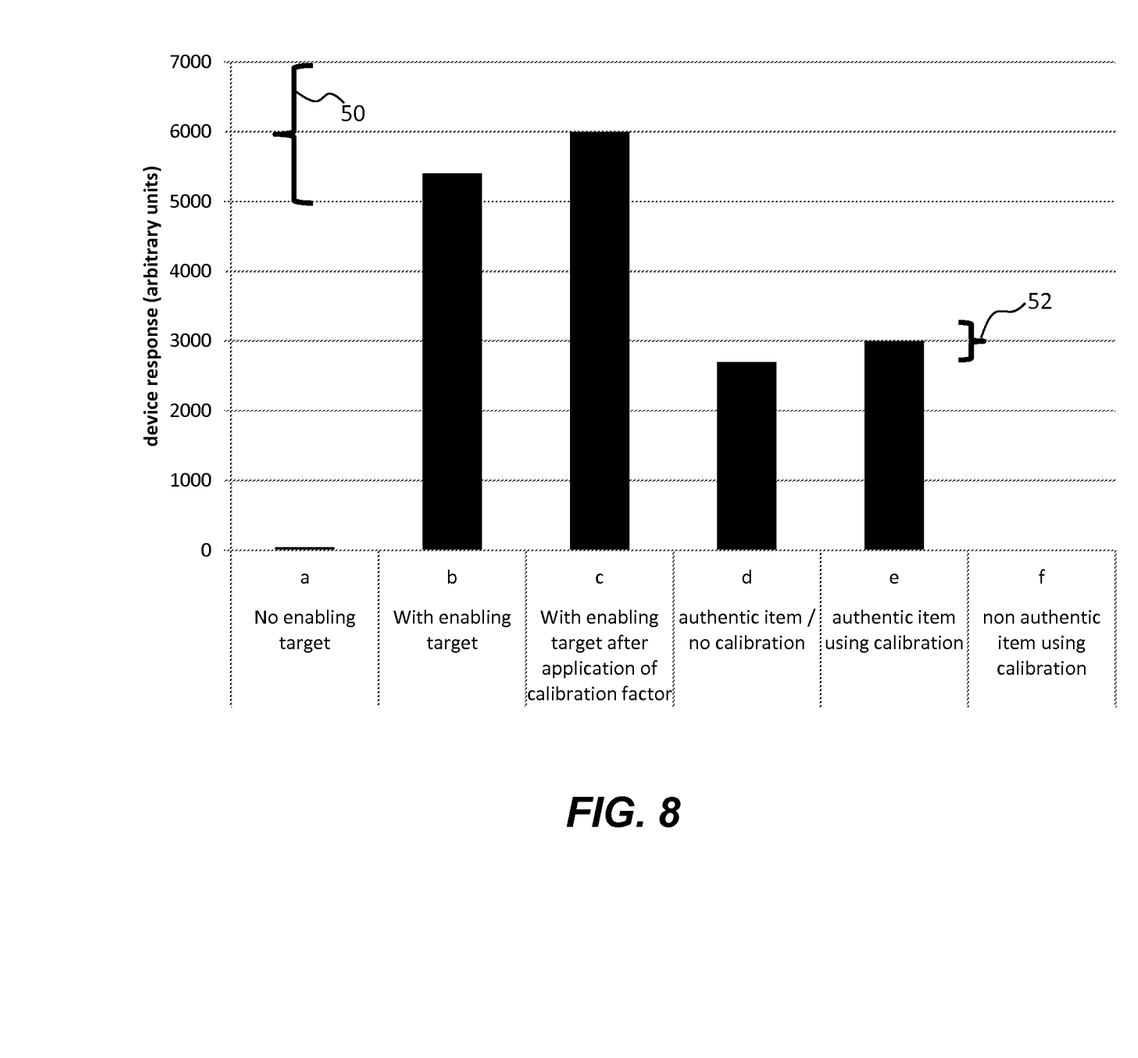
FIG. 8 is a graph illustrating an example of measurement results for the authentication device under different conditions.

FIG. 8 shows an example of measurement results of the authentication device 10 under different conditions a) to f). In condition a), the authentication device 10 was turned on in the absence of a first enabling target 17. The authentication device 10 response, shown on the vertical axis, is well outside the acceptance band for a genuine first enabling target 17 as indicated by the acceptance band bracket 50. Consequently, the authentication device 10 will remain in a disabled state allowing no further authentication processes to proceed. In condition b), the first enabling target 17 was present while the authentication device 10 was turned on. The response in this condition is within the acceptance bracket 50 and, as a result, the authentication device 10 enters normal authentication mode allowing subsequent authentication.

This measurement, however, also determines that the actual response value of 5400 was below the expected value of 6000, which is the center value of the acceptance band. As a result, the authentication device 10 will generate a calibration factor, in this case 1.111, which is applied to future reading. In the absence of other measurement variability, a subsequent power-on of the authentication device 10 placed on the first enabling target 17 will generate a response that exactly matches the expected value c). In an embodiment, enabling targets 17 are used for calibration rather than items 18 and the enabling target 17 have different security particles 20 to distinguish them from items 18.

The effect of the calibration on the authentication results is shown in sections d) and e) wherein the authentication device 10 is placed on an authentic item 18. In section d, no calibration is used and the response falls slightly outside the acceptance band for an authentic item 52. In this case the authentic item 18 will be misidentified as non-authentic. However, when the calibration factor, 1.111 in this example, is used in section e), the response of the authentication device 10 is within the acceptance band for an authentic item and the item 18 will correctly be identified as authentic. In the absence of a calibration procedure, the acceptance band for an authentic item 18 is wider, which reduces the selectivity of the authentication device 10. Section f) shows the response for a non-authentic item 18 which is outside the acceptance band of the authentication device 10 leading to a fail indication.

The calibration process may incorporate a mathematical process such as multiplication or convolution of the authentication device 18 response with a calibration factor stored in the memory 34 of microprocessor 30. It could also be a calibration factor that interacts with the characteristics of the irradiation source 22, photodetector 40, or amplifier 42, for example, by increasing the current of the irradiation source 22 or the gain of the amplifier 42 when the response is below the expected value, or by decreasing the current of the irradiation source 22 or the gain of the amplifier 42 when the response is above the predetermined expected value. Furthermore, while it is advantageous when calibration and authentication are conducted using the same optical components, it is possible to design a system where the calibration and enabling step are conducted with optical components (e.g. irradiation source 22 or photodetector 40 or both) that are different from the components used for the authentication process. In this case, different security marker particles 20 could be involved in the calibration/enabling and authentication steps.

As noted above, security marker particles 20 can degrade or decay over time. In an embodiment of the present invention, the security marker particles 20 are intentionally chosen, designed, or engineered to decay at a desired rate so that the enabling target 17 is a decaying enabling target 17. After a predetermined time related to the desired rate and security-marker-particle response (emitted electromagnetic radiation 26 in response to exciting electromagnetic radiation 24), the authentication device 10 will receive a response that falls outside the authentication band when the enabling target 17 is used to enable the authentication device 10 so that the authentication device 10 is not enabled. Thus, the authentication device 10 is effectively disabled and subsequently tested items 18 are not authenticated.

In an embodiment, the first predetermined time is selected to be relatively short, for example 24 hours. In this embodiment, a user of the authentication device 10 must re-enable the authentication device 10 daily, for example as illustrated in FIG. 2. If the decay rate of the security marker particles 20 in the enabling target 17 is chosen so that the authentication of the decaying enabling target 17 fails after one month, the authentication device 10 will cease operation after the one month has elapsed. Alternatively, the first predetermined time is selected to be the same as the decay failure time of the decaying enabling target 17, so that a user of the authentication device 10 can enable the authentication device 10 with a decaying enabling target 17 only once. Thereafter, a new decaying enabling target 17 is required to re-enable the authentication device 10. In this embodiment, no record of the comparison attribute is necessarily kept or used for comparison in the authentication device 10.

Thus, in a method of the present invention, one or more attributes of the first decaying enabling target 17 is measured with the authentication device 10 at a first time to have a first value. One or more attributes of the first decaying enabling target 17 is measured with the authentication device 10 at a second time after the first time to have a second value different from the first value and the second value does not match the first predetermined expected value so that the authentication device is not enabled.

The authentication devices 10 and enabling targets 17 should be kept under separate custody. If the authentication device 10 is stolen, it will not function without the enabling target 17, at least not after the predetermined period of time. The necessity of an enabling target 17 is inconspicuous because it is not requested by any authenticator response. Therefore, security for an authentication security system is improved.

The invention has been described in detail with particular reference to certain preferred embodiments thereof, but it will be understood that variations and modifications can be effected within the scope of the invention.

PARTS LIST 10 authentication device/security marker detection device
11 on/off switch
12 test button/control
14 authentication pass indicator
16 authentication fail indicator
17 enabling target
18 item
20 security marker particle
22 irradiation source
24 exciting electromagnetic radiation
26 emitted electromagnetic radiation
30 microprocessor
32 authentication indicator/information display
34 memory
36 timer
39 security marker detection system
40 photodetector
42 amplifier
50 acceptance band bracket
52 acceptance band bracket for authentic item
100 provide authentication device step
105 enable authentication device for predetermined time step
110 operate authentication device step
115 wait predetermined time step
120 disable authentication device step
150 provide first enabling target step
155 operate authentication device step
160 measure one or more attributes of enabling target step
165 compare attributer of first enabling target to expected value step
170 match step
172 compare current attribute to recorded attribute step
174 match step
175 enable authentication device step
176 record compared attribute step
180 set timer to first predetermined time step
200 provide ordered set of expected values step
205 initialize counter step
210 provide enabling target step
215 measure one or more attributes of enabling target step
220 compare attribute of enabling target to expected value step
225 increment counter step

The invention claimed is:

1. A method of enabling an authentication device, comprising:
providing a plurality of enabling targets;
measuring one or more attributes of each of the plurality of enabling targets with the authentication device at a first time;
providing a plurality of different predetermined expected values;
comparing at least one measured attribute of each of the plurality of enabling targets to any of the plurality of different predetermined expected values; and
enabling the authentication device for a first predetermined enablement time when the at least one measured attribute matches any of the plurality of different predetermined expected values;
wherein the one or more measured attributes are fluorescence or phosphorescence attributes determined by measuring a fluorescence or phosphorescence of the enabling target measured in response to irradiation by an irradiation source.

2. The method of claim 1, further including disabling the authentication device after the first predetermined enablement time.

3. The method of claim 1, wherein the plurality of enabling targets include a decaying enabling target.

4. The method of claim 3, further including:
measuring one or more attributes of the first decaying enabling target with the authentication device at a first time to have a first value;
measuring one or more attributes of the first decaying enabling target with the authentication device at a second time after the first time to have a second value; and
wherein the first value is different from the second value and the second value does not match the first predetermined expected value and the authentication device is not enabled.

5. The method of claim 1, further including:
recording the one or more measured attributes of each of the plurality of enabling targets;
measuring one or more attributes of each of the plurality of enabling targets with the authentication device at a second time after the first time;
comparing at least one measured attribute of each of the plurality of enabling targets measured at the second time with the recorded attributes; and not enabling the authentication device when the one or more attributes of the plurality of enabling targets measured at the second time match the recorded measured attributes.

6. The method of claim 1, further including:

providing a plurality of different enabling targets;

providing one or more predetermined enablement times;

measuring one or more attributes of each of the plurality of different enabling targets with the authentication device;

comparing at least one measured attribute of each of the plurality of different enabling targets to any of the plurality of different predetermined expected values; and enabling the authentication device for one of the one or more predetermined enablement times when the at least one measured attribute of each of the plurality of different enabling targets matches any of the plurality of predetermined expected values.

7. The method of claim 6, further including providing the plurality of different predetermined expected values as an ordered set of different predetermined expected values and the plurality of enabling targets as a corresponding ordered set of enabling targets.

8. The method of claim 7, further including:

sequentially measuring one or more attributes of each of the plurality of enabling targets with the authentication device at sequential times in the order specified in the ordered set;

comparing at least one measured attribute of each of the plurality of enabling targets with the corresponding one of the plurality of ordered different predetermined expected values; and enabling the authentication device for one of the one or more predetermined enablement times when the at least one measured attribute of the enabling target matches the corresponding predetermined expected value.

9. The method of claim 6, further including providing a plurality of different predetermined enablement times.

10. The method of claim 1, further including operating the authentication device after it is enabled.

11. The method of claim 1, further including disabling the authentication device when the measured attribute does not match the predetermined expected value.

12. The method of claim 1, further including creating a record when the authentication device is enabled or disabled.

13. The method of claim 1, further including creating a record when at least one measured attribute does not match the first predetermined expected value.

\* \* \* \* \*